United States Patent [19]
Van Der Broeck et al.

[11] Patent Number: 5,747,958
[45] Date of Patent: May 5, 1998

[54] CIRCUIT ARRANGEMENT FOR POWERING A TWO-PHASE ASYNCHRONOUS MOTOR

[75] Inventors: Heinz Van Der Broeck, Zülpich; Matthias Wendt, Würselen, both of Germany

[73] Assignee: U.S. Philips Corporation, New York, N.Y.

[21] Appl. No.: 645,440

[22] Filed: May 13, 1996

[30] Foreign Application Priority Data

May 26, 1995 [DE] Germany .................. 195 19 370.9

[51] Int. Cl.$^6$ ........................................ H02P 7/00
[52] U.S. Cl. ................................ 318/747; 318/439
[58] Field of Search ........................... 318/746–748, 318/727, 778–779, 781, 798–815, 254, 138, 439

[56] References Cited

U.S. PATENT DOCUMENTS

| | | | |
|---|---|---|---|
| 2,527,718 | 10/1950 | Grass | 318/747 |
| 2,671,877 | 3/1954 | Stewart | 318/747 |
| 4,081,727 | 3/1978 | Green | 318/814 |
| 4,137,488 | 1/1979 | Sibalis | 318/778 |
| 4,160,196 | 7/1979 | Ismatkhodzhaev et al. | 318/749 |
| 4,584,505 | 4/1986 | Chung et al. | 318/254 |
| 4,774,448 | 9/1988 | Yoshitomi | 318/746 |
| 5,136,216 | 8/1992 | Wills | 318/123 |
| 5,216,348 | 6/1993 | Ito | 318/696 |
| 5,218,283 | 6/1993 | Willis et al. | 318/748 |
| 5,446,361 | 8/1995 | Van Der Broeck | 317/747 |

FOREIGN PATENT DOCUMENTS

4232134 3/1994 Germany .................. H02P 7/63

Primary Examiner—David S. Martin
Attorney, Agent, or Firm—Edward Blocker

[57] ABSTRACT

A power supply circuit for a two-phase asynchronous motor having two windings at a preset angle there-between. The supply circuit has three nodes at which are respectively supplied three node voltages U1, U2, U3 which are derived as logic combinations of a basic pulse train and a pulsed switching signal having a switching frequency and a duty cycle. The motor windings are respectively connected between the first and second nodes and between the second and third nodes. The voltage U2 at the second node has a rectangular waveform. The voltages U1 and U3 at the first and third nodes alternate between time intervals in which the voltage level is constant and time intervals in which the voltage is pulse modulated, and have a phase angle there-between corresponding to that between the motor windings. Pulse modulated intervals of each of the first and third node voltages coincide with constant voltage intervals of the other of those voltages, and the pulses in the pulse modulated intervals have a duty cycle which corresponds with a desired amplitude ratio of the voltages produced across the motor windings. The circuit achieves significant reduction in the required number of switching edges of the node voltages, thereby reducing power dissipation.

5 Claims, 3 Drawing Sheets

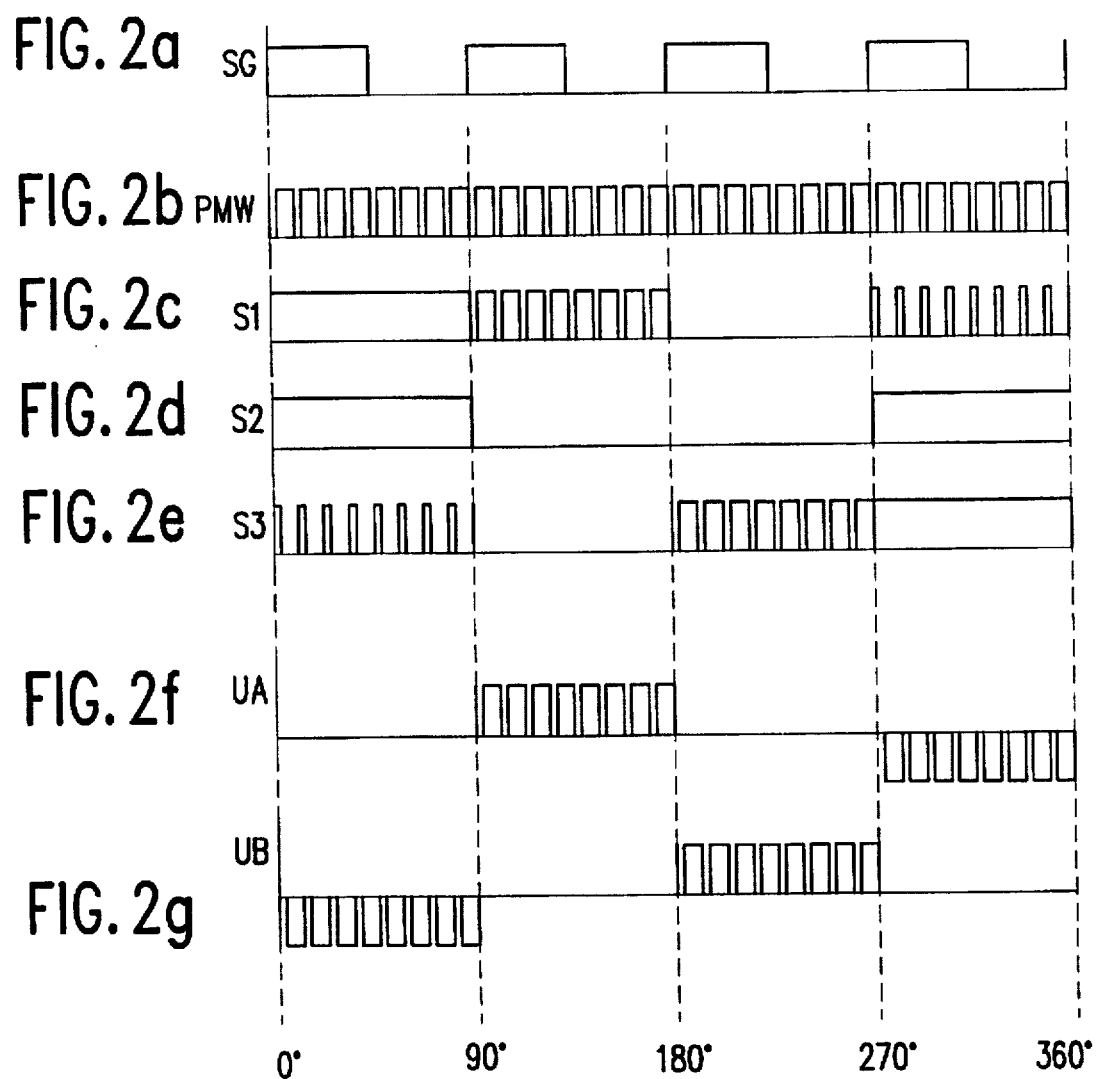

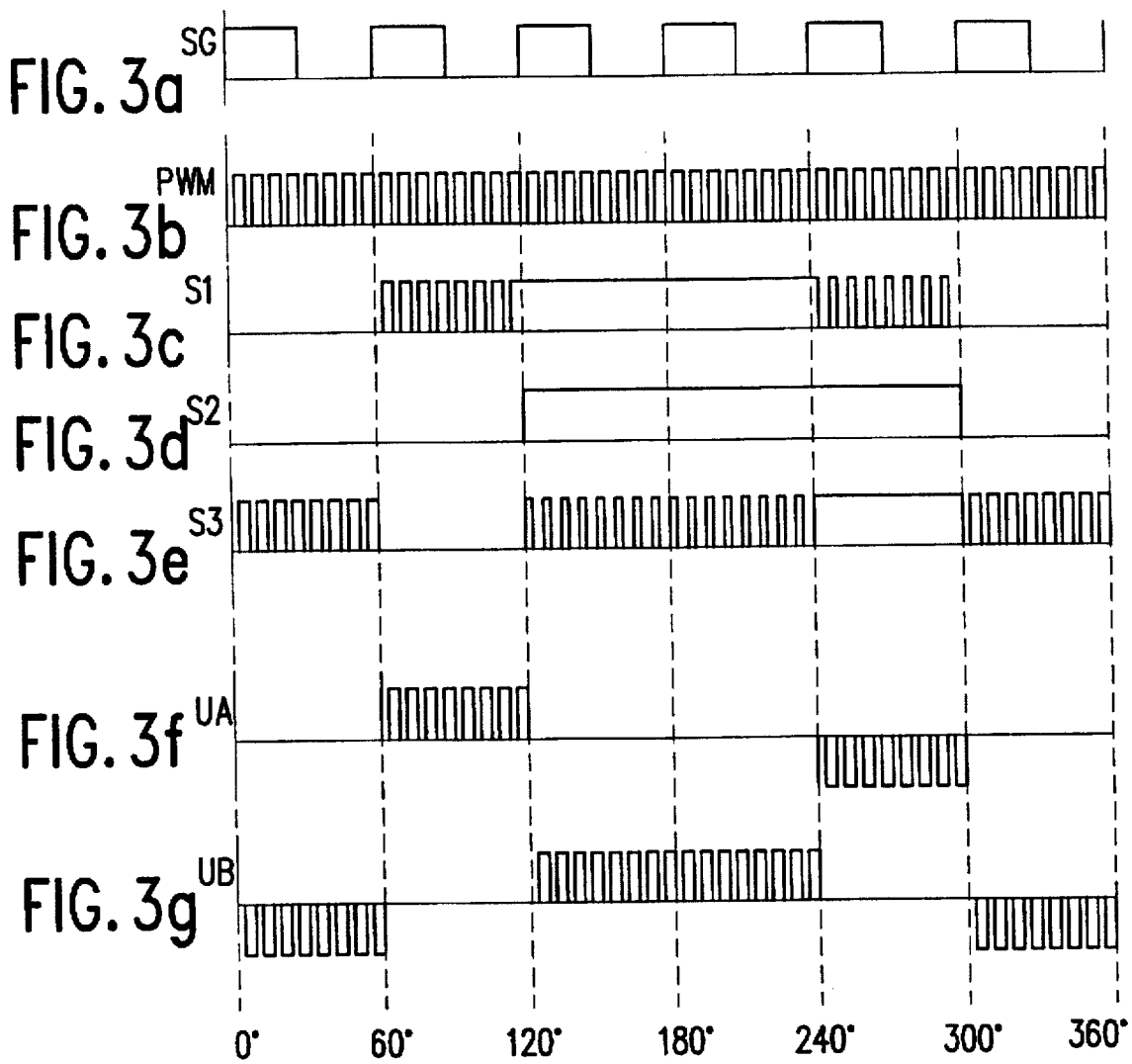

CIRCUIT ARRANGEMENT FOR POWERING A TWO-PHASE ASYNCHRONOUS MOTOR

BACKGROUND OF THE INVENTION

1. Field of the Invention

The invention relates to a circuit arrangement for powering a two-phase asynchronous motor having two windings which each have one end connected to a first and a third node, respectively, and which both have another end connected to a second node, the nodes each being arranged to receive a respective one of three alternating voltages which have substantially the same sinusoidal fundamental.

2. Description of the Related Art

Such a circuit arrangement is known from DE-OS 42 32 134. In said circuit arrangement the power dissipation in a switching circuit connected to the third node is reduced so as to permit a more economical dimensioning without a deterioration of the performance, particularly the loadability, in that the alternating voltage to be applied to the second node assumes constant levels in given periodically recurring time intervals.

U.S. Pat. No. 5,136,216 discloses a drive system for driving a conventional single-phase "PSC" motor by means of a two-phase power source. This motor also comprises two windings which each have one end connected to one node and which have both ends connected to a further node. These nodes receive rectangular signals which are pulse-width modulated in accordance with a sinusoidal function. The motor can be powered by means of a three-phase inverter generating a two-phase alternating voltage, by means of a single-phase source with a starting capacitor, or by means of a two-phase inverter.

SUMMARY OF THE INVENTION

It is an object of the invention to provide an improved power supply a circuit arrangement for a two-phase asynchronous motor of the type defined in the opening paragraph so as to obtain an even more significant reduction of the power dissipated in preferably all the switching circuits connected to the nodes.

According to the invention this object is achieved with a circuit arrangement wherein the alternating voltage applied to the second node has a rectangular waveform of fundamental frequency, the alternating voltages applied to the first and the third node, respectively, are given such a lead and such a lag as regards the phases of their sinusoidal fundamental waves that the resulting voltages across the windings have a phase angle relative to one another which corresponds to the (mechanical) angle between the windings, the first and the third alternating voltage each have time intervals with constant (non-modulated) voltage values and time intervals which are positioned symmetrically in time relative thereto and in which the voltage is pulse modulated with a given duty cycle and with a switching frequency which is high relative to the fundamental frequency, in each of the time intervals only the first or the third alternating voltage is pulse modulated, the other (third or first) alternating voltage being constant (non-modulated); and the duration of the time intervals with a pulse modulated voltage as well as the duty cycle of the pulses in each of these time intervals are determined in accordance with a desired amplitude ratio of the voltages across the motor windings.

The duty cycle is defined as the ratio of the duration of a positive voltage within one period of the switching frequency to the overall duration of such period.

In comparison with the state of the art the circuit arrangement in accordance with the invention makes it possible to obtain a significant reduction of the number of switching edges of the alternating voltages to be applied to the nodes. Since each switching edge, i.e. each switching event in this alternating voltage, is attended with losses in the switching circuits causing these switching events, a reduction of the number of switching events in each period of the fundamental wave also means a reduction of the power dissipation. The reduction of the thermal load obtained by means of the invention makes it possible to obtain simpler and lower cost dimensioning of the circuit arrangement, particularly of said switching circuits. The required waveforms of the alternating voltages on the nodes can then be generated by simple means. By a suitable dimensioning of the time intervals with a constant voltage and with a pulse-modulated voltage, i.e. of the voltage values and of the duty cycle, the phase relationships and amplitudes of the voltages across the windings can readily be adapted to the design characteristics of different motors to be powered. Motors having similar windings as well as motors having different windings can be powered in a simple manner.

Preferably, the duty cycles in every two symmetrically positioned time intervals of the first or the third alternating voltage in which the voltage is pulse modulated are selected to be one another's complement of 1. The sum of such complementary duty cycles is then 1.

These values of the duty cycle can be generated simply by inverting a rectangular signal having one of the desired duty cycles. The duty cycle is then preferably constant in the individual time intervals of the pulse-modulated voltage. Close approximations to sinusoidal waveforms of the voltages across the windings with acceptable harmonic contents can then be obtained by means of a very simple pulse-width modulation, fundamental waves which are 90° phase-shifted being formed in the special case.

In a preferred embodiment of the circuit arrangement in accordance with the invention the time intervals with a constant voltage and those with a pulse modulated voltage form a time pattern with a frequency (basic pulse train frequency) which is an integral multiple of the fundamental frequency, and the alternating voltages are derived from a logic combination of a signal having said basic pulse train frequency and a switching signal having the switching frequency and having a desired duty cycle as stated above. The waveform with the basic pulse train frequency can then dictate the speed of the motor in an advantageous manner and can also be incorporated simply in an electronic commutation controlled by the angle of rotation. The switching frequency, however, is preferably constant independently of the operating condition of the motor to be powered.

BRIEF DESCRIPTION OF THE DRAWINGS

Some exemplary embodiments of the invention are shown in the drawings and will be described in more detail hereinafter. In the drawings:

FIG. 2 shows some signal waveforms for an example of a power supply of a motor having symmetrical windings, and FIG. 3 shows similar signal waveforms for an example of the power supply of a motor having asymmetrical windings.

DESCRIPTION OF THE PREFERRED EMBODIMENTS

Figure 1:
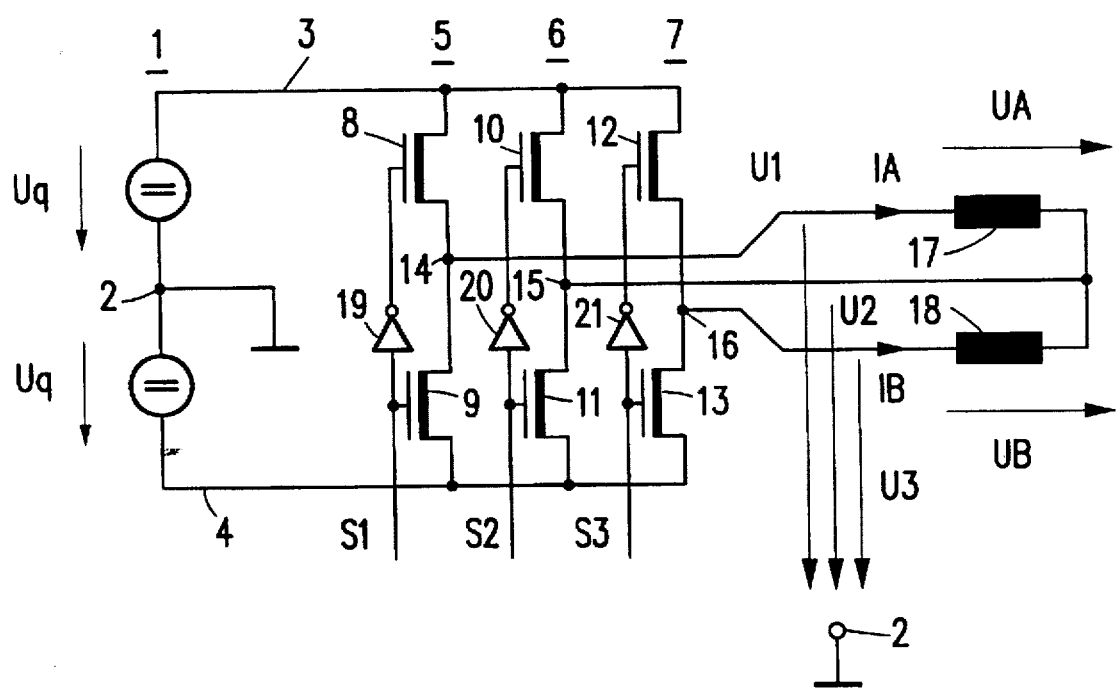
FIG. 1 is a schematic circuit diagram of a circuit arrangement for powering a motor having two windings by means of a three-phase power inverter.

FIG. 1 is a schematic circuit diagram for a circuit arrangement by means of which a two-phase asynchronous motor can be powered advantageously in accordance with the power supply waveforms of FIGS. 2 and 3. This circuit arrangement comprises a direct voltage source 1, which for simplicity is shown in FIG. 1 as a series arrangement of two sources which each supply a direct voltage Uq and whose node is coupled to ground 2. At its terminals 3 and 4 the direct voltage source 1 respectively supplies a positive voltage UQ and a negative voltage -UQ relative to ground potential (potential on 2). The direct voltage source 1 may comprise a mains rectifier, a switched-mode power supply, a battery or the like.

Three switch sections 5, 6 and 7, which each comprise two series-connected switch stages 8, 9; 10, 11 and 12, 13, respectively, are connected across the terminals 3, 4 of the direct voltage source 1. In the example shown in FIG. 1 each of the switch stages 8 to 13 comprises a field-effect transistor whose source-drain path forms a current path for the currents to be applied to the two-phase asynchronous motor. For this purpose the drain terminal of the field-effect transistor of the first switch stage 8, 10 or 12 of each switch section is connected to the positive terminal 3 of the direct voltage source 1, and the source terminal of the field-effect transistor of the second switch stage 9, 11 or 13 of each switch section is connected to the negative terminal 4 of the direct voltage source 1 Moreover, in each of the switch sections 5, 6 and 7 the source terminal of the field-effect transistor of the first switch stage 8, 10 or 12 is connected to the drain terminal of the field-effect transistor of the associated second switch stage 9, 11 or 13. The last-mentioned connection forms a first, second and third node 14, 15 and 16, respectively. A first winding 17 of the two-phase asynchronous motor is connected between the first node 14 and the second node 15 and a second winding 18 of this motor is connected between the second node 15 and the third node 16. The first winding 17 may be a main winding and the second winding 18 may be an auxiliary winding or the other way round; however, the two windings may also be dimensioned identically.

The switch sections 5, 6 and 7 serve to apply three periodic alternating voltages U1, U2 and U3, respectively, to the nodes 14, 15 and 16, respectively. In FIG. 1 these voltages are shown relative to ground. The difference between the first alternating voltage U1 on the first node 14 and the second alternating voltage U2 on the second node 15 forms a voltage UA across the first winding 17, and the difference between the third alternating voltage U3 on the third node 16 and the second alternating voltage U2 on the second node 15 forms a voltage UB across the second winding 18. Currents IA and IB flow through the windings 17 and 18, respectively.

The gate terminals of the first and the second switch stages 8, 9; 10, 11 and 12, 13 of the switch sections 5, 6 and 7, respectively, are connected to one another via an inverter 19, 20 and 21, respectively. In operation control signals S1, S2 and S3 can be applied to the gate terminals of the second switch stages 9, 11 and 13, respectively. These signals control the first and the second switch stage 8, 9; 10, 11 and 12, 13, respectively, in an opposite sense, so that the nodes 14, 15 and 16 can be connected selectively to the positive terminal 3 or the negative terminal 4 of the direct voltage source 1. By an appropriate control of the control signals S1, S2 and S3 different waveforms are generated for the alternating voltages U1 to U3.

FIGS. 2a–2g show waveforms of a number of signals in the circuit arrangement in FIG. 1 in a first example of an operating situation. The windings 17 and 18 are dimensioned identically and are arranged to be 90° shifted relative to one another. Accordingly, they are powered with voltages UA and UB which are shifted through 90° relative to their fundamental wave. In FIGS. 2f and 2g these signals have been plotted particularly in relation to one period of this fundamental wave.

FIG. 2a shows a signal having a frequency corresponding to four times the fundamental frequency and having a rectangular waveform. The frequency of this signal SG is referred to as the basic pulse train frequency; the signal may consequently be referred to as the basic pulse train.

FIG. 2b shows diagrammatically a switching signal represented as a rectangular waveform with the switching frequency and with a given duty cycle. In contrast with the basic pulse train frequency, which directly dictates the motor speed, the switching frequency of the switching signal PWM is constant in all operating situations of the motor and is high relative to the basic pulse train frequency. The control signals S1 to S3 shown in FIGS. 2c to 2e are derived from the basic pulse train SG and the switching signal PWM by logic operations. The state or waveform of each of the control signals S1 to S3 then changes on a rising switching edge of the basic pulse train SG. For example, the first control signal S1 assumes a high value between the first two rising edges of the basic pulse train SG in the first time interval corresponding to a motor phase between 0° and 90°. In the second time interval corresponding to a motor phase between 90° and 180° the first control signal S1 is pulse modulated in accordance with the switching signal PWM and in the third time interval it assumes a constant unmodulated low level. In the fourth time interval corresponding to a motor phase of 270° to 360° the first control signal S1 is again pulse modulated, the duty cycle of this pulse modulation in the last-mentioned time interval and the duty cycle in the second time interval (between 90° and 180°) being related to one another as complements of 1. These two time intervals with a pulse-modulated waveform of the first control signal S1 are symmetrically positioned in time relative to the time interval (between 0° and 90°) in which the first control signal S1 assumes a constant high level. This becomes apparent when the signal waveforms are extended beyond the shown period of the fundamental wave.

The third control signal S3 has a similar waveform. However, it has a phase lead of 90° with respect to the first control signal S1, referred to the fundamental frequency. Conversely, the second control signal has only a rectangular waveform with the fundamental frequency, it being phase centered relative to the phases of the fundamental waves of the first and the third control signal S1 and S3.

The control signals S1 to S3 generate alternating voltages U1 to U3, which are not shown explicitly in FIG. 2 but whose waveforms correspond directly to those of the control signals S1 to S3. These alternating voltages U1 to U3 give rise to voltages UA and UB across the windings 17, 18 of the motor, whose waveforms are shown in FIGS. 2f) and 2g). The waveforms of the voltages UA and UB are similar to one another with a 90° phase shift relative to the fundamental frequency. The described complementary definition of the duty cycles in the individual time intervals result in identical duty cycles in the voltages UA and UB for all the time intervals.

FIG. 2 shows that the second control signal S2 in each period of the fundamental frequency produces only two switching operations and that at any instant (or in any time interval) only one of the other control signals S1 and S3 is pulse modulated. Thus, in comparison with the state of the art the number of switching operations per period of the fundamental frequency is drastically reduced and, consequently, the power dissipation in the switch sections 5, 6 and 7 is reduced considerably. In spite of this, an unrestricted power control between zero load and full load is possible by selection of the duty cycle.

FIG. 3 is a diagram similar to that in FIG. 2 for the operation of a motor with asymmetrical windings 17, 18. In this example the basic pulse train frequency is six times the fundamental frequency; accordingly, the basic pulse train SG shown in FIG. 3a) comprises six rectangular pulses within the period of the fundamental frequency shown in FIG. 3. The amplitude ratio between the voltages UA and Ub across the asymmetrical windings 17 and 18 is now, for example:

$$1:\sqrt{3} \ .$$

In principle, the control signals S1 to S3 have the same characteristics as those in the case of FIG. 2, i.e. they have the same symmetrical arrangement of pulse modulated and non-modulated time intervals. The fundamental wave of the first control signal S1 has a phase lead of 30° relative to the fundamental wave of the second control signal S2, relative to which the fundamental wave of the third control signal S3 has a phase lag of 60°. Altogether this yields a phase difference of 90° for the fundamental wave between the control signals S1 and S3, which also occurs in the fundamental waves of the voltages UA and UB across the windings 17 and 18, respectively. The total duration of the time intervals in which the voltage Ub across the second winding 18 assumes a non-zero voltage value is larger than the total duration of the comparable time intervals of the voltage UA across the first winding 17 in accordance with the voltage ratio to be obtained.

We claim:

1. A power supply circuit for a two-phase asynchronous motor having two windings at preset physical angle there-between, said power supply circuit comprising three switching stages respectively having first, second and third nodes, a first of said motor windings being coupled between the first and second nodes and a second of said motor windings being coupled between the second and third nodes, and voltage supply means coupled to said switching stages for respectively supplying first, second and third periodic voltages U1, U2 and U3 at the first, second and third nodes, said voltages having substantially the same fundamental frequency; said power supply circuit being characterized in that:

the voltage U2 at the second node has a rectangular waveform;

the voltages U1, U3 at the first and third nodes have a phase angle there-between corresponding to said preset physical angle, and each alternates between time intervals in which the voltage is at a constant level and time intervals in which the voltage is pulse modulated in correspondence with a selected duty cycle and at a frequency which is high relative to said fundamental frequency; and the pulse modulated intervals of each of the first and third node voltages U1, U3 coincide with the constant voltage intervals of the other of said voltages, and the pulses in the pulse modulated intervals have a duty cycle which corresponds with a desired amplitude ratio of the voltages produced by the node voltages across the first and second motor windings.

2. A power supply circuit as claimed in claim 1, wherein the duty cycles of pulses in successive pulse modulated time intervals of each of the first and third node voltages are one's complements of each other.

3. A power supply circuit as claimed in claim 1, wherein the node voltages U1, U2, U3 are derived by said voltage supply means as logic combinations of (i) a basic pulse train having a pulse frequency and (ii) a pulsed switching signal having a switching frequency and a duty cycle corresponding to that of pulses in the pulse modulated intervals of the first and third node voltages.

4. A power supply circuit as claimed in claim 3, wherein the pulse frequency of said basic pulse train is an integral multiple of said fundamental frequency, and the node voltages U1, U2, U3 produce across the first and second motor windings voltages UA, UB having 1:1 amplitude ratio.

5. A power supply circuit as claimed in claim 3, wherein the pulse frequency of said basic pulse train is six times said fundamental frequency, and the node voltages U1, U2, U3 produce across the first and second motor windings voltages UA, UB having a 1:√3 amplitude ratio.

* * * * *